(12) United States Patent
Liu et al.

(10) Patent No.: US 12,270,008 B2
(45) Date of Patent: Apr. 8, 2025

(54) METHOD FOR HYDROTREATING AND RECYCLING WASTE LUBRICATING OIL

(71) Applicant: CHINA UNIVERSITY OF PETROLEUM (EAST CHINA), Qingdao (CN)

(72) Inventors: Bin Liu, Qingdao (CN); Yongming Chai, Qingdao (CN); Chenguang Liu, Qingdao (CN); Yuan Pan, Qingdao (CN); Yichuan Li, Qingdao (CN); Kongyuan Zhang, Qingdao (CN); Yunqi Liu, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 70 days.

(21) Appl. No.: 18/036,192

(22) PCT Filed: Jan. 10, 2022

(86) PCT No.: PCT/CN2022/071133
§ 371 (c)(1),
(2) Date: May 10, 2023

(87) PCT Pub. No.: WO2022/100763
PCT Pub. Date: May 19, 2022

(65) Prior Publication Data
US 2024/0010944 A1  Jan. 11, 2024

(30) Foreign Application Priority Data
Nov. 12, 2020 (CN) .......................... 202011257524.0

(51) Int. Cl.
C10M 175/00 (2006.01)
B01J 31/02 (2006.01)
(Continued)

(52) U.S. Cl.
CPC .... C10M 175/0016 (2013.01); B01J 31/0239 (2013.01); B01J 37/04 (2013.01);
(Continued)

(58) Field of Classification Search
CPC ............ B01J 2531/842; B01J 2531/847; B01J 31/0239; B01J 37/04; B01J 37/20;
(Continued)

(56) References Cited

U.S. PATENT DOCUMENTS 3,935,295 A * 1/1976 La Hue ...................... C01B 7/01
  423/230
4,151,072 A * 4/1979 Nowack ........... C10M 175/0016
  208/182

(Continued)

FOREIGN PATENT DOCUMENTS

CN    1386826 A  * 12/2002
CN  102260527 A    12/2011
(Continued)

OTHER PUBLICATIONS

Xv, et al., Research Progress of the Oil-soluble Catalyst for Slurry-bed Hydrocracking of Heavy Oil, Contemporary Chemical Industry, May 2018, vol. 47, No. 5, China.
(Continued)

*Primary Examiner* — Latosha Hines

(57) ABSTRACT

A method for hydrotreating and recycling waste lubricating oil, the method comprising the two steps of slurry bed pre-hydrotreatment and deep hydrotreatment, specifically as follows: mechanical impurities are removed from waste lubricating oil, and then the oil is subjected to flash distillation to separate free water and a portion of light hydrocarbons; a bottom product of the flash distillation column is mixed with hydrogen and a self-sulfurizing oil-soluble transition metal catalyst, and then enters a slurry bed reactor for
(Continued)

pre-hydrotreatment; a liquid product obtained by performing separation on a reaction effluent is subjected to hydrocyclone separation and solvent washing to remove solid residue, and then a pre-treated lubricating oil component is obtained; said component is mixed with hydrogen and then enters a hydrofining reactor, an isomerization-dewaxing reactor, and a supplementary refining reactor, connected in series, for hydrotreatment; and the reaction products are separated to obtain high-quality naphtha, diesel oil and a lubricating base oil. The method of the present invention has such advantages as simple processing procedures, a high oil liquid yield, good lubricating oil base oil quality, and can implement full-fraction resource utilization of waste lubricating oil. In addition, the oil-soluble catalyst features simple dispersion, no need for vulcanization, a small catalyst adding amount, high low-temperature hydrogenation activity, is capable of effectively preventing the coking that could occur during a process of preheating the waste lubricating oil, and ensures long-term stable operation of the device.

17 Claims, 1 Drawing Sheet

(51) Int. Cl.
 *B01J 37/04* (2006.01)
 *B01J 37/20* (2006.01)
 *C10G 67/14* (2006.01)
 *C10N 60/02* (2006.01)
(52) U.S. Cl.
 CPC .............. *B01J 37/20* (2013.01); *C10G 67/14* (2013.01); *C10M 175/0058* (2013.01); *B01J 2231/645* (2013.01); *B01J 2531/64* (2013.01); *B01J 2531/842* (2013.01); *B01J 2531/847* (2013.01); *C10G 2300/1007* (2013.01); *C10N 2060/02* (2013.01)
(58) Field of Classification Search
 CPC .......... B01J 2231/645; B01J 2531/0213; B01J 2531/64; B01J 2531/845; B01J 27/043; B01J 27/051; B01J 27/0515; B01J 31/0238; B01J 31/0275; B01J 31/226; C10G 2400/04; C10G 2400/10; C10G 67/14; C10G 2300/1007; C10G 2400/02; C10G 45/16; C10G 65/043; C10G 67/02; C10M 175/0016; C10M 175/0041; C10M 175/0058; C10M 175/0033; C10M 175/02; C10N 2060/02
 See application file for complete search history.

(56) References Cited

U.S. PATENT DOCUMENTS

| 4,238,362 A | 12/1980 | Bertus et al. |
| 5,086,027 A | 2/1992 | Singhal et al. |
| 2008/0070816 A1* | 3/2008 | Martin de Julian ........................ C10M 175/0058 508/136 |

FOREIGN PATENT DOCUMENTS

| CN | 102665907 A | | 9/2012 | |
| CN | 103349999 A | | 10/2013 | |
| CN | 105733793 A | | 7/2016 | |
| CN | 106398765 A | * | 2/2017 | ............ B01J 23/755 |
| CN | 108745385 A | | 11/2018 | |
| CN | 110194968 A | * | 9/2019 | ............ C10G 67/00 |
| CN | 110237851 A | | 9/2019 | |
| WO | 2020109452 A | | 6/2020 | |

OTHER PUBLICATIONS

Liu, et al., Hydrocracking of Gudao Residue by Using Dispersed-phase Catalysts I. Preliminary Evaluation of Catalysts, Refining Petroleum, 1993, pp. 57-62, vol. 24, China.

Cao, et al., Research Progress on Application of the Thiocarbonate, Journal of Sichuan University of Science & Engineering( Natural Science Edition), Apr. 2013, vol. 26 No. 2, China.

Perpinan et al., Reactions between bis(O-alkyl dithiocarbonato) nickel(II) complexes and phosphines. Formation of a dithiocarbonate complex of nickel(II): [Ni(S2CO) (Ph2PCH2CH2PPh2], Journal or the Chemical Society , Dalton Transactions, pp. 281-284, 1987 (2).

Zhao, et al., Regeneration Technology of Waste Lubricating Oil, Chemical Engineering Design Communications, Jan. 2017, vol. 43 No. 1, China.

\* cited by examiner

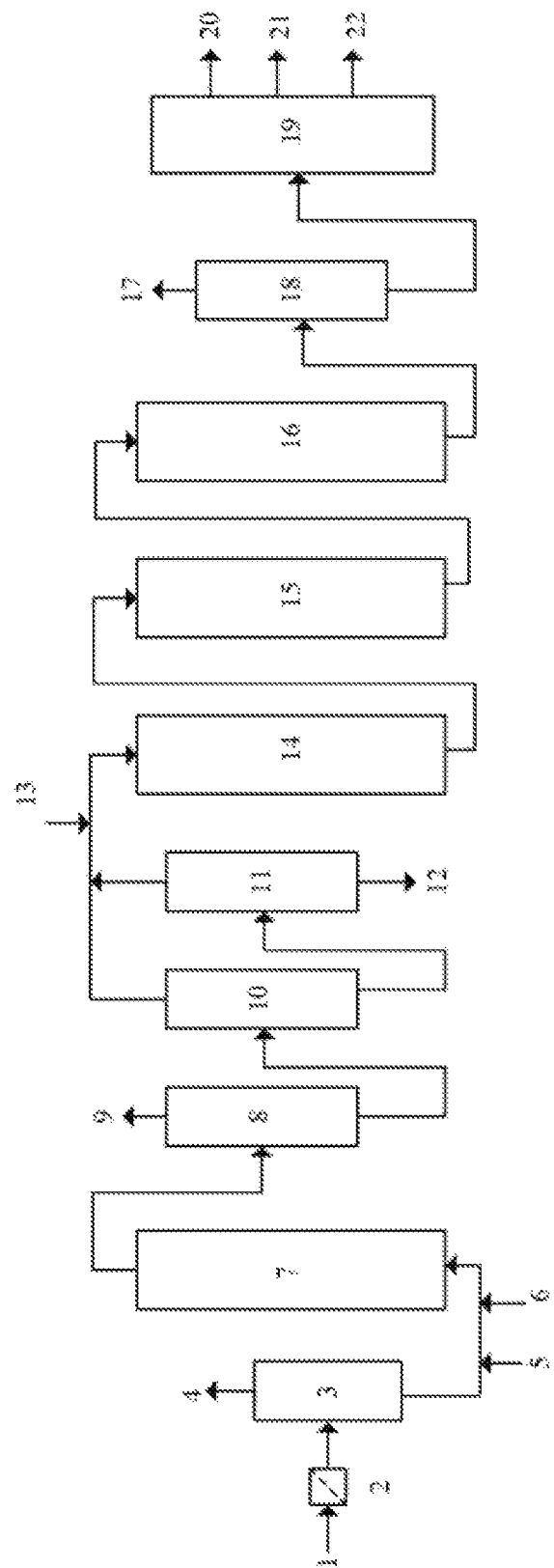

METHOD FOR HYDROTREATING AND RECYCLING WASTE LUBRICATING OIL

RELATED APPLICATIONS

This is a national phase application of PCT/CN2022/071133 filed Jan. 10, 2022, which claims the benefit of CN202011257524.0 filed Nov. 12, 2020, each of which is incorporated herein by reference in its entirety.

FIELD OF THE INVENTION

The present invention relates to the technical field of petrochemical industry, and more specifically, to a process or method for hydrotreating and recycling waste lubricating oil.

BACKGROUND OF THE INVENTION

China is the third largest consumer of lubricating oil in the world, second only to the United States and Russia, consuming over 6-8 million tons of lubricating oil every year. With the increase in the number of motor vehicles and the increase in the lubricating oil consumption, the amount of waste oil replaced from vehicles and equipment every year has seen a dramatic growth. In the wake of the dwindling petroleum resource and the continuous rise in the crude oil price, the contradiction between energy supply and demand stands out. As a result, waste lubricating oil recycling has become a practical problem confronted by China's environmental protection and energy saving, and also attracted increasing attention from people.

The most environmentally friendly, operable, and large-scale process in the regeneration of waste lubricating oil is the hydrogenation process, which can regenerate waste lubricating oil to obtain lubricating base oil products and some high-quality diesel meeting standards. The processing route of hydrogenation usually involves dewatering, filtration, and adsorption of raw waste lubricating oil to remove water, mechanical impurities, colloids, asphaltene, and most heavy metal impurities from it; the waste lubricating oil after adsorption is subjected to pre-hydrorefining for further removal of impurities in a reactor loaded with a protective agent; and after pre-hydrorefining, the waste lubricating oil enters a main hydrogenation reactor for hydrorefining under the action of a hydrogenation catalyst, so that the undesired components in the raw oil are hydrogenated and saturated while the product is fractionated and cut to obtain a final target product.

However, in recent years, a variety of mechanical equipment has higher requirements for the performance of lubricating oil products. In order to meet the requirements of harsh working conditions of mechanical equipment for the performance of lubricating oil, manufacturers are adding more and more additives in the finished lubricating oil products, such as antioxidant, anti-wear agent, friction improver, extreme pressure additive, clearing agent, dispersant, foam preparation, anti-corrosion/antirust agent, flow improver, pour point depressant, and viscosity index promoter, which typically contain compounds of metal such as calcium, zinc, copper, barium, magnesium, and lead. Since the waste lubricating oil contains heavy metal compounds brought by additives and the like, they are prone to deposition on the surface of a hydrogenation catalyst during hydrogenation, causing rapid poisoning of the catalyst and resulting in deactivation of the catalyst to shorten its service life, and also prone to deposition on the outer surface of the catalyst particles or accumulation in the particle gaps, causing catalyst bed caking and clogging which leads to a rapid increase in the pressure drop of a reactor and accordingly shutdown. In addition, due to different sources of waste lubricating oil, the waste oil has complex impurities and compositions, especially high metal content, which cause prevailing problems such as device clogging and corrosion in the hydrogenation route, and present high requirements for the continuity of the production process and the smoothness of long-term operation. Therefore, it is a difficulty of the waste lubricating oil regeneration technology to effectively remove heavy metals, avoid their impacts on catalysts and devices, and ensure smooth and long-term operation of the hydrogenation process.

In order to eliminate the impact of impurities such as heavy metal, the technical process used widely at present is pre-hydrorefining in a reactor loaded with a protective agent, which can remove the vast majority of additives and metals. On the other hand, the anti-poisoning capability of catalyst is enhanced by improving the catalyst preparing process. However, the current problem is that a trace amount of metal additives, mainly compounds of metal such as calcium, zinc and magnesium, still remain after pre-hydrogenation of waste lubricating oil. These metal additives are likely to react under hydrogen reaction conditions, to generate calcium, zinc and magnesium and deposit on the surface of the catalyst. Due to the slow diffusion rate of calcium, zinc and magnesium on the surfaces of the inner pores of the catalyst, they are unlikely to deposit in the pores of the catalyst, but continuously aggregate and grow on the outer surface of the catalyst to block the pores of the catalysts, and may partially separate from the outer surface of the catalyst and flow along with a liquid-phase material to fill in the gaps between the catalyst particles, leading to catalyst bed caking to cause a rapid rise in the bed pressure drop, so that the device undergoes frequent shutdown and catalyst replacement.

As a result, a new process for recycling waste lubricating oil is provided to eliminate the adverse impact of additive decomposition sediment on a conventional hydrotreating process, which is an urgent technical problem in the field.

OBJECTS AND SUMMARY OF THE INVENTION

In order to solve the above-mentioned technical problems in prior arts, it is an object of the invention to provide a method for hydrotreating and recycling waste lubricating oil. The method described in the present invention utilizes a novel slurry bed hydrogenation reactor and a self-sulfurizing oil-soluble transition metal catalyst to achieve high-temperature hydrogenation conversion of undesired components such as additive components, colloids and asphaltenes in waste lubricating oil. At the same time, a method for hydrocyclone separation and solvent washing of solid residue is used to achieve efficient removal of the undesired components from lubricating oil by conversion into solid residue, thereby maximizing the purification of lubricating oil components. Furthermore, a hydrorefining reactor, an isomerization-dewaxing reactor and a supplementary refining reactor are adopted to realize deep hydrotreatment of lubricating oil, thereby obtaining a high-quality naphtha fraction, diesel fraction and lubricating base oil fraction. The inventive method has advantages such as simple processing procedures, high oil liquid yield, and good quality of lubricating base oil, and can realize full-fraction recycling of waste lubricating oil. In addition, the oil-soluble catalyst features simple dispersion, no need for vulcanization, a small catalyst adding amount and high hydrogenation activity at low temperature, and can effectively avoid possible coking during the preheating process of waste lubricating oil to ensure long-term stable operation of the device.

In order to achieve the above-mentioned object, the invention provides the following technical solutions.

A method for hydrotreating and recycling waste lubricating oil comprises the following steps:

1. Slurry Bed Pre-Hydrotreatment

S101 removing small-particle mechanical impurities from the waste lubricating oil with a filter; and separating free water and a portion of light hydrocarbons from the waste lubricating oil in a flash distillation column;

S102 mixing a bottom product obtained from the flash distillation column in with hydrogen gas and a self-sulfurizing oil-soluble transition metal catalyst; and pre-hydrotreating the mixture in a slurry bed hydrogenation reactor;

S103 separating a reaction effluent to obtain hydrogen-rich gas and a liquid product;

S104 separating the liquid product obtained in S103 with two-stage hydrocyclone separators to obtain a liquid product and a tailing residue; allowing the tailing residue to enter a solvent recovery tower; and discharging a tower bottom effluent as a solid residue from the solvent recovery tower;

S105 obtaining a slurry bed pre-hydrotreating product, which includes the liquid product from the two-stage hydrocyclone separators and a solvent from the solvent recovery tower;

2. Deep Hydrotreatment

S106 mixing the slurry bed pre-hydrotreating product with hydrogen gas; and streaming the mixture sequentially through a hydrofining reactor, an isomerization-dewaxing reactor and a supplementary refining reactor while the mixture is caused to react in turn through contact with a hydrorefining catalyst, an isomerization-dewaxing catalyst and a supplementary refining catalyst;

S107 separating an output material in S105 to obtain a naphtha fraction, a diesel fraction and a lubricant base oil fraction.

Further, the flash distillation column operates at a temperature of 100-200° C. and a pressure of 0.1-0.5 MPa in S101.

Further, the slurry bed hydrogenation reactor in S102 operates at a partial pressure of hydrogen of 4-20 MPa in the reactor, a reaction temperature of 320-420° C., a liquid hourly space velocity of 0.5-2 $h^{-1}$, and a volume ratio of hydrogen gas to the waste lubricating oil of 300-1,000 $Nm^3/m^3$. Undesired components such as additive components (metal and nonmetal compounds containing sulfur, nitrogen, oxygen and chlorine), colloids and asphaltenes in waste lubricating oil are removed by high-temperature hydrogenation.

Further, in S102, the waste lubricating oil enters the slurry bed hydrogenation reactor through a bottom of the slurry bed hydrogenation reactor and then flows upwards after the waste lubricating oil is mixed with the hydrogen gas and the self-sulfurizing oil-soluble transition metal catalyst in the slurry bed hydrogenation reactor.

Further, the hydrorefining reactor in S105 operates at a partial pressure of hydrogen of 4-20 MPa in the reactor, a reaction temperature of 280-400° C., a liquid hourly space velocity of 0.5-4 $h^{-1}$ and a volume ratio of hydrogen gas to the slurry bed pre-hydrotreatment product of 300-1,000 $Nm^3/m^3$.

Further, the isomerization-dewaxing reactor in S105 operates at a partial pressure of hydrogen of 4-20 MPa in the reactor, a reaction temperature of 320-420° C., a liquid hourly space velocity of 0.5-4 $h^{-1}$ and a volume ratio of hydrogen gas to the slurry bed pre-hydrotreatment product of 300-1,000 $Nm^3/m^3$.

Further, the supplementary hydrorefining reactor in S105 operates at a partial pressure of hydrogen of 4-20 MPa in the reactor, a reaction temperature of 250-400° C., a liquid hourly space velocity of 0.5-10 $h^{-1}$ and a volume ratio of hydrogen gas to the slurry bed pre-hydrotreatment product of 300-1,000 $Nm^3/m^3$.

Further, the self-sulfurizing oil-soluble transition metal catalyst in S102 is a single-component self-sulfurizing oil-soluble molybdenum catalyst, nickel catalyst, iron catalyst, or cobalt catalyst, or a self-sulfurizing oil-soluble composite catalyst composed of two, three or four metals mentioned above; and for every 1 g of waste lubricating oil, the total consumption of active metal(s) of the single-component catalyst or the composite catalyst is μg/g, wherein, calculated as molybdenum, it is 50-800 μg/g; calculated as nickel, it is μg/g; calculated as cobalt, it is 50-800 μg/g; and calculated as iron, it is 50-800 μg/g.

Further, the two-stage hydrocyclone separators in S104 operate at a pressure of MPa and a temperature of 50-180° C.

Further, the mass ratio of the solvent used in the solvent recovery tower to the tailing residue obtained from the hydrocyclone separator in S104 is 1-10:1.

Further, the solvent in S104 is naphtha, solvent oil No. 6, solvent oil No. 120, solvent oil No. 200, etc.

Further, the self-sulfurizing oil-soluble transition metal catalyst is prepared by optional following methods.

a. a self-sulfurizing oil-soluble molybdenum catalyst is prepared by the following steps:

(1) subjecting thiomolybdate and organic amine to one-step reaction to obtain an oil-soluble molybdenum-based catalyst precursor, the mass content of molybdenum in the molybdenum-based catalyst precursor being 1-20%, thiomolybdate including at least one of ammonium tetrathiomolybdate, sodium tetrathiomolybdate and ammonium dodecathiomolybdate, and organic amine including at least one of C6-C20 primary amines;

(2) adding the oil-soluble molybdenum-based catalyst precursor into an auxiliary dispersant to obtain a self-sulfurizing oil-soluble molybdenum catalyst;

Further, the oil-soluble molybdenum-based catalyst precursor in step (1) is prepared by the following steps:

S101 dissolving molybdate in ammonia water to obtain a solution in which a ratio of the ammonia water to the molybdate is 1/1-2 (mL/g);

S102 adding a sulfurization agent to the solution in S201; and reacting at 20-120° C. for 0.5-3 h to obtain a thiomolybdate solution, a molar ratio of the sulfur content in the sulfurization agent to the molybdenum being 4-6:1;

S103 adding the organic amine to the thiomolybdate solution; and reacting at 20-120° C. for 0.5-2 h to obtain the oil-soluble molybdenum-based catalyst precursor, a molar ratio of the organic amine to the molybdenum being 2-4:1;

the molybdate in S101 includes at least one of molybdenum trioxide, ammonium heptamolybdate and ammonium tetramolybdate; and the suflurization agent includes at least one of ammonium sulfide, ammonium polysulfide and sodium sulfide.

b. a self-sulfurizing oil-soluble molybdenum-nickel composite catalyst is prepared by the following steps:
  (1) reacting a sodium salt of higher alcohol with carbon disulfide to obtain alkyl-substituted sodium dithiocarbonate, and then reacting the alkyl-substituted sodium dithiocarbonate with a nickel source to obtain an oil-soluble nickel-based catalyst precursor, the mass content of nickel in the nickel-based catalyst precursor being 1-10%, the carbon number of the sodium salt of higher alcohol being 4-15 and the nickel source including at least one of nickel nitrate, nickel acetate, basic nickel carbonate, nickel chloride and nickel sulfate;
  (2) subjecting thiomolybdate and organic amine to one-step reaction to obtain an oil-soluble molybdenum-based catalyst precursor, the mass content of molybdenum in the molybdenum-based catalyst precursor being 1-20%, the thiomolybdate including at least one of ammonium tetrathiomolybdate, sodium tetrathiomolybdate and ammonium dodecathiomolybdate, and organic amine including at least one of C6-C20 primary amines;
  (3) adding the oil-soluble nickel-based catalyst precursor and the oil-soluble molybdenum-based catalyst precursor to an auxiliary dispersant to obtain a self-sulfurizing oil-soluble molybdenum-nickel composite catalyst.

Further, the oil-soluble nickel-based catalyst precursor in step (1) is prepared by the following steps:
  S101 heating the higher alcohol to 50-90° C.; adding sodium hydroxide to the higher alcohol while the higher alcohol is being stirred; and reacting at 50-110° C. for 0.5-6 h to obtain the sodium salt of higher alcohol, a molar ratio of the sodium hydroxide to the higher alcohol being 1-3:1;
  S102 adding the sodium salt of higher alcohol to carbon disulfide; and reacting at 10-90° C. for 0.5-6 h to obtain alkyl-substituted sodium dithiocarbonate, the molar ratio of the sodium salt of higher alcohol to the carbon disulfide being 1:1-6;
  S103 dissolving a nickel source in water or ammonia water to obtain solution;
  S104 adding alkyl-substituted sodium dithiocarbonate to the solution and reacting at 50-100° C. for 0.5-3 h, the molar ratio of alkyl-substituted sodium dithiocarbonate to nickel being 2-4:1;
  S105 cooling what is obtained in S104 to a room temperature, and removing the water phase to obtain a self-sulfurizing oil-soluble nickel-based catalyst precursor, the mass content of nickel being 1-10%.

Further, the higher alcohol in S101 includes at least one of C4-C16 fatty alcohol, phenol, and alkyl substituted aromatic alcohol.

Further, the oil-soluble molybdenum-based catalyst precursor in step (2) is prepared by the following steps:
  S201 dissolving molybdate in ammonia water to obtain a solution in which a ratio of the ammonia water to the molybdate is 1/1-2 (mL/g);
  S202 adding a sulfurization agent to the solution obtained in S201; and reacting at 20-120° C. for 0.5-3 h to obtain a thiomolybdate solution, a molar ratio of the sulfur content to the molybdenum in the sulfurization agent being 4-6:1; and
  S203 adding the organic amine to the thiomolybdate solution obtained in S202; and reacting at 20-120° C. for 0.5-2 h to obtain the oil-soluble molybdenum-based catalyst precursor, a molar ratio of the organic amine to the molybdenum being 2-4:1.

Further, the molybdate in S201 includes at least one of molybdenum trioxide, ammonium heptamolybdate and ammonium tetramolybdate; and the suflurization agent in S202 includes at least one of ammonium sulfide, ammonium polysulfide and sodium sulfide.

Further, in step (3) the ratio of the auxiliary dispersant to the totality of the oil-soluble molybdenum-based catalyst precursor and oil-soluble nickel-based catalyst precursor is 1-10:1 (g/g); and the auxiliary dispersant includes at least one of catalytic cracking diesel, catalytic cracking slurry oil, catalytic cracking gasoline, naphtha, straight-run diesel, straight-run gas oil, coker diesel and hydrocracking gas oil.

For the slurry bed hydrogenation pre-treatment purification process of waste lubricating oil, the consumption of catalyst is 50-5001 μg/g calculated as molybdenum and 50-500 μg/g calculated as nickel, and the slurry bed hydrogenation reactor operates at a reaction pressure of 5-15 MPa, a reaction temperature of 360-420° C., a volume space velocity of 0.5-2 $h^{-1}$ and a hydrogen-to-oil volume ratio of 200-500.

c. a self-sulfurizing oil-soluble nickel catalyst is prepared by the following steps:
  (1) reacting a sodium salt of higher alcohol with carbon disulfide to obtain alkyl-substituted sodium dithiocarbonate;
  (2) reacting the alkyl-substituted sodium dithiocarbonate with a nickel source to obtain a nickel catalyst precursor, the nickel source including at least one of nickel nitrate, nickel acetate, basic nickel carbonate, nickel chloride and nickel sulfate; and
  (3) adding the nickel catalyst precursor to an auxiliary dispersant to obtain a self-sulfurizing oil-soluble nickel catalyst.

Further, the nickel catalyst precursor in step (2) is prepared by the following steps:
  S101 heating the higher alcohol to 50-90° C.; and adding sodium hydroxide to the higher alcohol while the higher alcohol is being stirred; and reacting at 50-110° C. for 0.5-6 h to obtain the sodium salt of higher alcohol, a molar ratio of the sodium hydroxide to the higher alcohol being 1-3:1;
  S102 adding the sodium salt of higher alcohol to carbon disulfide, and reacting at 10-90° C. for 0.5-6 h to obtain alkyl-substituted sodium dithiocarbonate, the molar ratio of the sodium salt of higher alcohol to carbon disulfide being 1:1-6;
  S103 dissolving a nickel source in water or ammonia water to obtain solution;
  S104 adding alkyl-substituted sodium dithiocarbonate to the solution and reacting at 50-100° C. for 0.5-3 h, the molar ratio of alkyl-substituted sodium dithiocarbonate to nickel being 2-4:1; and
  S105 cooling what is obtained in S104 to a room temperature, and removing the water phase to obtain a self-sulfurizing oil-soluble nickel-based hydrocracking catalyst, the mass content of nickel being 1-10%.

Further, the higher alcohol in S101 includes at least one of C4-C16 fatty alcohol, phenol, and alkyl substituted aromatic alcohol.

Further, the auxiliary dispersant in step (3) includes at least one of catalytic cracking diesel, catalytic cracking slurry oil, catalytic cracking gasoline, naphtha, straight-run diesel, straight-run gas oil, coker diesel and hydrocracking gas oil.

Further, the ratio of the auxiliary dispersant to the nickel-based precursor is 1-10:1 (g/g) in step (3).

Further, for the slurry bed hydrogenation pre-treatment purification process of waste lubricating oil, the consumption of catalyst is 50-500 μg/g calculated based on nickel, and the slurry bed hydrogenation reactor operates at a reaction pressure of 5-15 MPa, a reaction temperature of 360-420° C., a volume space velocity of 0.5-2.0 h$^{-1}$ and a hydrogen-to-oil volume ratio of 200-500.

d. a self-sulfurizing oil-soluble nickel-cobalt-iron composite catalyst is prepared by the following steps:
   (1) reacting a sodium salt of higher alcohol with carbon disulfide to obtain alkyl-substituted sodium dithiocarbonate, the carbon number of the sodium salt of higher alcohol being 4-16;
   (2) reacting the alkyl-substituted sodium dithiocarbonate with a mixed solution of group VIII metals, which include a nickel source, a cobalt source and an iron source, to obtain a nickel-cobalt-iron composite catalyst precursor, the molar ratio of the alkyl-substituted sodium dithiocarbonate to the totality of nickel, iron and cobalt being 2-4:1, the nickel source including at least one of nickel nitrate, nickel acetate, basic nickel carbonate, nickel chloride and nickel sulfate, the cobalt source including at least one of cobalt nitrate, cobalt acetate, basic cobalt carbonate, cobalt chloride and cobalt sulfate, and the iron source including at least one of ferric nitrate, ferric acetate, ferric chloride and ferric sulfate; and
   (3) adding the nickel-cobalt-iron composite catalyst precursor to an auxiliary dispersant to obtain the self-sulfurizing oil-soluble nickel-cobalt-iron composite catalyst.

Further, the nickel-cobalt-iron composite catalyst precursor in step (2) is prepared by the following steps:
   S101 heating the higher alcohol to 50-90° C.; and adding sodium hydroxide to the higher alcohol while the higher alcohol is being stirred; and reacting at 50-110° C. for 0.5-6 h to obtain the sodium salt of higher alcohol, a molar ratio of the sodium hydroxide to the higher alcohol being 1-3:1;
   S102 adding the sodium salt of higher alcohol to carbon disulfide, and reacting at 10-90° C. for 0.5-6 h to obtain alkyl-substituted sodium dithiocarbonate, the molar ratio of the sodium salt of higher alcohol to carbon disulfide being 1:1-6;
   S103 dissolving a nickel source, a cobalt source and an iron source in water to obtain mixed solution;
   S104 adding alkyl-substituted sodium dithiocarbonate to the mixed solution and reacting at 50-100° C. for 0.5-3 h, the molar ratio of alkyl-substituted sodium dithiocarbonate to the totality of nickel, cobalt and iron being 2-4:1; and
   S105 cooling what is obtained in S104 to a room temperature, and removing the water phase to obtain a self-sulfurizing oil-soluble nickel-cobalt-iron composite catalyst precursor.

Further, the higher alcohol in S101 includes at least one of C4-C16 fatty alcohol, phenol, and alkyl substituted aromatic alcohol.

Further, in step (2) and S103, the molar ratio of the iron source, the cobalt source and the nickel source is (1-10):(1-5):1.

Further, the auxiliary dispersant in step (3) includes at least one of catalytic cracking diesel, catalytic cracking slurry oil, catalytic cracking gasoline, naphtha, straight-run diesel, straight-run gas oil, coker diesel and hydrocracking gas oil.

Further, the ratio of the auxiliary dispersant to the nickel-cobalt-iron composite catalyst precursor is 1-10:1 (g/g) in step (3).

Further, for the slurry bed hydrogenation pre-treatment purification process of waste lubricating oil, the consumption of catalyst is 50-500 μg/g calculated as nickel, 50-300 μg/g calculated as cobalt, and 50-1001 μg/g calculated as iron, and the slurry bed hydrogenation reactor operates at a reaction pressure of 5-15 MPa, a reaction temperature of 360-420° C., a volume space velocity of 0.5-2.0 h$^{-1}$ and a hydrogen-to-oil volume ratio of 200-500.

Compared with the prior arts, the method for hydrotreating and recycling waste lubricating oil described in the present invention has the following beneficial effects:
(1) a novel slurry bed hydrogenation reactor and self-sulfurizing oil-soluble transition metal catalyst are used to realize high-temperature hydrogenation conversion of undesired components such as additive components, colloids and asphaltenes in waste lubricating oil, and achieve advantages such as simple process, high conversion rate of undesired components, high yield (up to 98%) of oil liquid products and good quality;
(2) the self-sulfurizing oil-soluble catalyst features simple dispersion, no need for vulcanization, and a small catalyst adding amount, can be decomposed at a low temperature, and has hydrogenation activity to thereby effectively avoid possible coking during the preheating process of waste lubricating oil and prolong the operation period of a waste lubricating oil pre-hydrotreatment device;
(3) two stages of series-connected hydrocyclone separators are adopted to realize efficient removal of the undesired components from lubricating oil by conversion into solid residue, so that the contents of metal and nonmetal in the pre-treated clean oil are lower than 30 ppm, to meet the requirements of a subsequent hydrorefining process for the raw material and ensure the long-period stable operation of the hydrorefining device;
(4) a hydrorefining reactor, an isomerization-dewaxing reactor, and a supplementary refining reactor are connected in series to achieve deep hydrotreatment, thereby obtaining high-quality naphtha, diesel and lubricating base oil fractions.

BRIEF DESCRIPTION OF FIGURES

FIG. 1 is a process flow diagram of a process for pre-hydrotreating and purifying waste lubricating oil according to the present invention.

1: waste lubricating oil, 2: filter, 3: flash distillation column, 4: water and light hydrocarbon, 5: hydrogen gas, 6: self-sulfurizing oil-soluble catalyst, 7: slurry bed hydrogenation reactor, 8: separator, 9: hydrogen gas and light hydrocarbon, 10: hydrocyclone separator, 11: solvent recovery tower, 12: solid residue, 13: hydrogen gas, 14: hydrorefining reactor, 15: isomerization-dewaxing reactor, 16: supplementary refining reactor, 17: hydrogen gas and light hydrocarbon, 18: separator, 19: atmospheric/reduced pressure separation unit, 20: naphtha fraction, 21: diesel fraction, 22: lubricating base oil fraction.

DETAILED DESCRIPTION OF THE EMBODIMENTS

The method provided by the invention is further illustrated in conjunction with the accompanying drawing. In the drawing, equipment such as pump, heat exchanger and compressor is omitted, which is known for those skilled in the art.

As shown in FIG. 1, a process of the inventive method is described in detail as following:

1. slurry bed pre-hydrotreatment: removing small-particle mechanical impurities from waste lubricating oil from pipeline 1 with a filter 2, and separating free water and a portion of light hydrocarbons from the waste lubricating oil in a flash distillation column 3; mixing a bottom product from the flash distillation column with hydrogen gas 5 and a self-sulfurizing oil-soluble transition metal catalyst 6, and performing pre-hydrotreatment in a slurry bed hydrogenation reactor 7 at a partial pressure of hydrogen of 4-20 MPa in the reactor, a reaction temperature of 320-420° C., a liquid hourly space velocity of 0.5-4 $h^{-1}$, and a volume ratio of hydrogen gas to the waste lubricating oil of 300-1,000 $Nm^3/m^3$, to achieve high-temperature conversion of undesired components such as additive components, colloids and asphaltenes in the waste lubricating oil; subjecting a hydrogenation product to gas liquid separation in a separator 8 to obtain hydrogen gas and light hydrocarbon 9, and causing the obtained liquid product to enter a hydrocyclone separator 10 for liquid solid separation, mixing the obtained tailing residue and solvent, and feeding into a solvent recovery tower 11 to give tower bottom effluent as solid residue to be discharged out of the device; the hydrocyclone separator operates at a pressure 0.2-2 MPa and a temperature of 50-180° C.; and obtaining a slurry bed pre-hydrotreatment product, which includes the liquid product from the hydrocyclone separator and the product output from the top of the solvent recovery tower.

2. deep hydrotreatment: mixing the slurry bed pre-hydrotreatment products with hydrogen gas 13 before streaming through a hydrorefining reactor 14, an isomerization-dewaxing reactor 15 and a supplementary refining reactor 16 in sequence, wherein the hydrorefining reactor operates at a partial pressure of hydrogen of 4-20 MPa in the reactor, a reaction temperature of 280-400° C., a liquid hourly space velocity of 0.5-4 $h^{-1}$ and a volume ratio of hydrogen gas to the slurry bed pre-hydrotreatment product of 300-1,000 $Nm^3/m^3$, the isomerization-dewaxing reactor operates at a partial pressure of hydrogen of 4-20 MPa in the reactor, a reaction temperature of 320-420° C., a liquid hourly space velocity of 0.5-4 $h^{-1}$ and a volume ratio of hydrogen gas to the slurry bed pre-hydrotreatment product of 300-1,000 $Nm^3/m^3$, and the supplementary hydrorefining reactor operates at a partial pressure of hydrogen of 4-20 MPa in the reactor, a reaction temperature of 250-400° C., a liquid hourly space velocity of 0.5-10 $h^{-1}$ and a volume ratio of hydrogen gas to the slurry bed pre-hydrotreatment product of 300-1,000 $Nm^3/m^3$; and subjecting the hydrogenation product to gas liquid separation in a separator 18 to obtain hydrogen gas and light hydrocarbon 17, and causing the obtained liquid product to enter an atmospheric/reduced pressure separation unit 19 to finally obtain high-quality naphtha fraction 20, diesel fraction 21 and lubricating base oil fraction 22.

The following embodiments will further illustrate the method provided by the present invention, but do not limit it accordingly.

TABLE 1 main properties of waste lubricating oil

| Items | Waste lubricating oil |
|---|---|
| Density (20° C.), g/cm³ | 0.8756 |
| 40° C. kinematic viscosity, mm²/s | 50 |
| Acid value, mgKOH/g | 1.5 |
| Sulfur content, μg/g | 3,500 |
| Nitrogen content, μg/g | 1,500 |
| Chlorine content, μg/g | 300 |
| Moisture, wt % | 2.0 |
| Metal and nonmetal heteroatoms, μg/g | 3,650 |
| Open flash point, ° C. | 170 |
| Distillation range, ° C. | |
| Initial boiling point/5% | 225/325 |
| 10%/30% | 348/378 |
| 50%/70% | 400/425 |
| 90%/95% | 485/520 |
| Final boiling point | 560 |

TABLE 2 slurry bed pre-hydrotreatment test conditions

| Items | Example 1 | Example 2 | Example 3 | Example 4 |
|---|---|---|---|---|
| Catalyst system | Mo | Mo Ni | Ni | Ni Co Fe |
| Calculated quantity of catalyst, ppm | 200 | 100 100 | 200 | 100 100 100 |
| Reaction temperature, ° C. | 390 | 390 | 390 | 390 |
| Partial pressure of hydrogen, MPa | 8 | 8 | 8 | 8 |
| Volume space velocity, $h^{-1}$ | 1.0 | 1.0 | 1.0 | 1.0 |
| Hydrogen-to-oil volume ratio, $Nm^3/m^3$ | 600 | 600 | 600 | 600 |

Example 1

Waste lubricating oil is processed by use of the slurry bed pre-hydrotreatment steps of the inventive method with a self-sulfurizing oil-soluble molybdenum catalyst developed by the State Key Laboratory of Heavy Oil. The reaction conditions and reaction results are shown in Table 2 and Table 3. The self-sulfurizing oil-soluble molybdenum catalyst is prepared by the following steps:

weighing molybdenum trioxide 30 g, adding distilled water 200 mL and ammonia water (with concentration of 17%) 60 mL in sequence, stirring, and heating to 40° C. for dissolving; adding ammonium sulfide solution (with a sulfur content of 8%) 360 mL to the solution while stirring, heating to 80° C. and stirring to react for 2 h; filtering the liquid containing crystals by suction filtration with a Buchner funnel, washing with distilled water, and drying at a room temperature for 12 h to obtain ammonium tetrathiomolybdate; adding ammonium tetrathiomolybdate 15 g to dodecylamine, and reacting at 60° C. for 1 h to obtain an oil-soluble molybdenum catalyst precursor, the molar ratio of dodecylamine to molybdenum being 2.5:1; and adding the oil-soluble molybdenum catalyst precursor to catalytic cracking diesel as auxiliary dispersant at a molar ratio of 1:3 (g/g) while stirring, and fully dissolving to obtain molybdenum-based precursor solution, i.e. self-sulfurizing oil-soluble molybdenum catalyst.

Example 2

Waste lubricating oil is processed by use of the slurry bed pre-hydrotreatment steps of the inventive method with a self-sulfurizing oil-soluble molybdenum-nickel composite catalyst developed by the State Key Laboratory of Heavy Oil. The reaction conditions and reaction results are shown in Table 2 and Table 3. The self-sulfurizing oil-soluble molybdenum-nickel composite catalyst is a product prepared by optional following methods.

Example 2.1

A method for preparing the self-sulfurizing oil-soluble molybdenum-nickel composite catalyst comprises weighing molybdenum trioxide 30 g, adding distilled water 200 mL and ammonia water (with concentration of 17%) 60 mL in sequence, stirring and heating to 40° C. for dissolving; adding ammonium sulfide solution (with a sulfur content of 8%) 360 mL to the solution while stirring, heating to 80° C. and stirring to react for 2 h; filtering the liquid containing crystals by suction filtration with a Buchner funnel, washing with distilled water, and drying at a room temperature for 12 h to obtain ammonium tetrathiomolybdate; adding ammonium tetrathiomolybdate 15 g to dodecylamine, and reacting at 60° C. for 1 h to obtain an oil-soluble molybdenum catalyst precursor, the molar ratio of dodecylamine to molybdenum being 2.5:1;
- weighing n-butanol 37 g, heating to 80° C., adding sodium hydroxide 20 g, and reacting at 80° C. for 0.5 h to obtain sodium n-butoxide; adding the sodium n-butoxide to carbon disulfide 80 g, and reacting at 30° C. for 5 h while stirring to obtain alkyl substituted thiocarbonate; weighing nickel nitrate hexahydrate 75 g, adding distilled water 150 mL, stirring to dissolve, adding the alkyl substituted thiocarbonate, reacting at 95° C. for 2 h while stirring, cooling the reaction product to room temperature, and filtering to remove the water phase and obtain a self-sulfurizing oil-soluble nickel-based catalyst precursor; and
- adding the oil-soluble molybdenum catalyst precursor to catalytic cracking diesel as auxiliary dispersant at a molar ratio of 1:3 (g/g) while stirring, fully dissolving, and adding the oil-soluble nickel-based catalyst precursor at a mass ratio of 1:1 between nickel and molybdenum, to obtain solution containing molybdenum-based and nickel-based precursors, that is, self-sulfurizing oil-soluble molybdenum-nickel composite catalyst.

Example 2.2

A method for preparing the self-sulfurizing oil-soluble molybdenum-nickel composite catalyst comprises weighing molybdenum trioxide 30 g, adding distilled water 200 mL and ammonia water (with concentration of 17%) 60 mL in sequence, stirring and heating to 40° C. for dissolving; adding ammonium sulfide solution (with a sulfur content of 8%) 360 mL to the solution while stirring, heating to 80° C. and stirring to react for 2 h; filtering the liquid containing crystals by suction filtration with a Buchner funnel, washing with distilled water, and drying at a room temperature for 12 h to obtain ammonium tetrathiomolybdate; adding ammonium tetrathiomolybdate 15 g to dodecylamine, and reacting at 60° C. for 1 h to obtain an oil-soluble molybdenum catalyst precursor, the molar ratio of dodecylamine to molybdenum being 2.5:1;
- weighing n-pentanol 44 g, heating to 80° C., adding sodium hydroxide 20 g, and reacting at 80° C. for 2 h to obtain sodium n-pentoxide; adding the sodium n-pentoxide to carbon disulfide 80 g, and reacting at 30° C. for 4 h while stirring to obtain alkyl substituted thiocarbonate;
- weighing nickel chloride hexahydrate 60 g, adding distilled water 180 mL, stirring to dissolve, adding the alkyl substituted thiocarbonate, reacting at 80° C. for 2 h while stirring, cooling the reaction product to room temperature, and filtering to remove the water phase and obtain a self-sulfurizing oil-soluble nickel-based catalyst precursor; and
- adding the oil-soluble molybdenum catalyst precursor to catalytic cracking diesel as auxiliary dispersant at a molar ratio of 1:3 (g/g) while stirring, fully dissolving, and adding the oil-soluble nickel-based catalyst precursor at a mass ratio of 1:1 between nickel and molybdenum, to obtain solution containing molybdenum-based and nickel-based precursors, that is, self-sulfurizing oil-soluble molybdenum-nickel composite catalyst.

Example 3

Waste lubricating oil is processed by use of the slurry bed pre-hydrotreatment steps of the inventive method with a self-sulfurizing oil-soluble nickel catalyst developed by the State Key Laboratory of Heavy Oil. The reaction conditions and reaction results are shown in Table 2 and Table 3. The self-sulfurizing oil-soluble nickel catalyst is a product prepared by optional following methods.

Example 3.1

A method for preparing the self-sulfurizing oil-soluble nickel catalyst comprises weighing n-butanol 37 g, heating to 80° C., adding sodium hydroxide 20 g, and reacting at 80° C. for 0.5 h to obtain sodium n-butoxide; adding the sodium n-butoxide to carbon disulfide 80 g, and reacting at 30° C. for 5 h while stirring to obtain alkyl substituted thiocarbonate;
- weighing nickel nitrate hexahydrate 75 g, adding distilled water 150 mL, stirring to dissolve, adding the alkyl substituted thiocarbonate, reacting at 95° C. for 2 h while stirring, cooling the reaction product to room temperature, and filtering to remove the water phase and obtain a self-sulfurizing oil-soluble nickel-based catalyst precursor; and
- adding the oil-soluble nickel catalyst precursor to catalytic cracking diesel as auxiliary dispersant at a molar ratio of 1:3 (g/g) while stirring, and fully dissolving to obtain nickel-based precursor solution, that is, self-sulfurizing oil-soluble nickel catalyst.

Example 3.2

A method for preparing the self-sulfurizing oil-soluble nickel catalyst comprises weighing n-pentanol 44 g, heating to 80° C., adding sodium hydroxide 20 g, and reacting at 80° C. for 2 h to obtain sodium n-pentoxide; adding the sodium n-pentoxide to carbon disulfide 80 g, and reacting at 30° C. for 4 h while stirring to obtain alkyl substituted thiocarbonate;
- weighing nickel chloride hexahydrate 60 g, adding distilled water 180 mL, stirring to dissolve, adding the alkyl substituted thiocarbonate, reacting at 80° C. for 2 h while stirring, cooling the reaction product to room temperature, and filtering to remove the water phase and obtain a self-sulfurizing oil-soluble nickel-based catalyst precursor; and adding the oil-soluble nickel-based catalyst precursor to catalytic cracking slurry oil as auxiliary dispersant at a ratio of 1:3 (g/g) while stirring, and fully dissolving to obtain nickel-based precursor solution, that is, self-sulfurizing oil-soluble nickel catalyst.

Example 3.3

A method for preparing the self-sulfurizing oil-soluble nickel catalyst comprises weighing benzyl alcohol 54 g, heating to 90° C., adding sodium hydroxide 20 g, and reacting at 90° C. for 2 h to obtain sodium benzyloxide; adding the sodium benzyloxide to carbon disulfide 100 g, and reacting at 30° C. for 5 h while stirring to obtain aryl substituted thiocarbonate;

weighing nickel chloride hexahydrate 60 g, adding distilled water 180 mL, stirring to dissolve, adding the aryl substituted thiocarbonate, reacting at 90° C. for 2 h while stirring, cooling the reaction product to room temperature, and filtering to remove the water phase and obtain a self-sulfurizing oil-soluble nickel-based catalyst precursor; and adding the oil-soluble nickel-based catalyst precursor to coker diesel as auxiliary dispersant at a ratio of 1:3 (g/g) while stirring, and fully dissolving to obtain nickel-based precursor solution, that is, self-sulfurizing oil-soluble nickel catalyst.

Example 4

Waste lubricating oil is processed by use of the slurry bed pre-hydrotreatment steps of the inventive method with a self-sulfurizing oil-soluble nickel-cobalt-iron composite catalyst developed by the State Key Laboratory of Heavy Oil. The reaction conditions and reaction results are shown in Table 2 and Table 3. The self-sulfurizing oil-soluble nickel-cobalt-iron composite catalyst is a product prepared by optional following methods.

Example 4.1

A method for preparing the self-sulfurizing oil-soluble nickel-cobalt-iron composite catalyst comprises weighing n-butanol 74 g, heating to 80° C., adding sodium hydroxide 20 g, and reacting at 80° C. for 0.5 h to obtain sodium n-butoxide; adding the sodium n-butoxide to carbon disulfide 160 g, and reacting at 30° C. for 5 h while stirring to obtain alkyl substituted thiocarbonate;

weighing nickel nitrate hexahydrate 50 g, cobalt nitrate hexahydrate 50 g and ferric nitrate 44 g, adding distilled water 300 mL, stirring to dissolve, adding the alkyl substituted thiocarbonate, reacting at 95° C. for 2 h while stirring, cooling the reaction product to room temperature, and filtering to remove the water phase and obtain a self-sulfurizing oil-soluble nickel-cobalt-iron composite catalyst precursor; and adding the oil-soluble nickel-cobalt-iron composite catalyst precursor to catalytic cracking diesel as auxiliary dispersant at a molar ratio of 1:3 (g/g) while stirring, and fully dissolving to obtain a self-sulfurizing oil-soluble nickel-cobalt-iron composite catalyst.

Example 4.2

A method for preparing the self-sulfurizing oil-soluble nickel-cobalt-iron composite catalyst comprises weighing n-pentanol 88 g, heating to 80° C., adding sodium hydroxide 40 g, and reacting at 80° C. for 2 h to obtain sodium n-pentoxide; adding the sodium n-pentoxide to carbon disulfide 160 g, and reacting at 30° C. for 4 h while stirring to obtain alkyl substituted thiocarbonate;

weighing nickel chloride hexahydrate 40 g, cobalt chloride hexahydrate 40 g and ferric chloride hexahydrate 48 g, adding distilled water 360 mL, stirring to dissolve, adding the alkyl substituted thiocarbonate, reacting at 80° C. for 2 h while stirring, cooling the reaction product to room temperature, and filtering to remove the water phase and obtain a self-sulfurizing oil-soluble nickel-cobalt-iron composite catalyst precursor; and adding the oil-soluble nickel-cobalt-iron composite catalyst precursor to catalytic cracking slurry oil as auxiliary dispersant at a molar ratio of 1:3 (g/g) while stirring, and fully dissolving to obtain a self-sulfurizing oil-soluble nickel-cobalt-iron composite catalyst.

Example 4.3

A method for preparing the self-sulfurizing oil-soluble nickel-cobalt-iron composite catalyst comprises weighing benzyl alcohol 108 g, heating to 90° C., adding sodium hydroxide 40 g, and reacting at 90° C. for 2 h to obtain sodium benzyloxide; adding the sodium benzyloxide to carbon disulfide 200 g, and reacting at 30° C. for 5 h while stirring to obtain aryl substituted thiocarbonate;

weighing nickel chloride hexahydrate 40 g, cobalt chloride hexahydrate 40 g and ferric chloride hexahydrate 48 g, adding distilled water 360 mL, stirring to dissolve, adding the aryl substituted thiocarbonate, reacting at 90° C. for 2 h while stirring, cooling the reaction product to room temperature, and filtering to remove the water phase and obtain a self-sulfurizing oil-soluble nickel-cobalt-iron composite catalyst precursor; and adding the oil-soluble nickel-cobalt-iron composite catalyst precursor to catalytic cracking diesel as auxiliary dispersant at a molar ratio of 1:3 (g/g) while stirring, and fully dissolving to obtain a self-sulfurizing oil-soluble nickel-cobalt-iron composite catalyst.

TABLE 3 slurry bed pre-hydrotreatment reaction results

| Items | Example 1 | Example 2 | Example 3 | Example 4 |
|---|---|---|---|---|
| Product distribution, m % | | | | |
| Naphtha fraction (<180° C.) | 2.10 | 2.40 | 2.45 | 2.51 |
| Diesel fraction (180-350° C.) | 12.85 | 13.51 | 13.67 | 13.71 |
| Lubricating oil fraction (>350° C.) | 83.90 | 82.87 | 82.65 | 82.67 |
| Liquid yield | 98.85 | 98.78 | 98.77 | 98.89 |
| Product property | | | | |
| Acid value, mgKOH/g | 0.22 | 0.24 | 0.26 | 0.25 |
| Sulfur content, µg/g | 2,150 | 2,250 | 2,380 | 2,310 |
| Nitrogen content, µg/g | 1,100 | 1,170 | 1,210 | 1,190 |
| Chlorine content, µg/g | <2 | <2 | <2 | <2 |
| Metal and nonmetal heteroatoms, µg/g | 16 | 18 | 21 | 20 |

From the results in Table 3, it can be seen that, after slurry bed pre-hydrotreatment of waste lubricating oil with the inventive method, the contents of both metal and nonmetal heteroatoms in the purified lubricating oil product are lower than 21 μg/g, with a removal rate of up to 99.4%, and the chlorine content is lower than 2 μg/g, to achieve efficient removal of undesired components from lubricating oil by conversion into solid residue, thereby meeting the requirements of a subsequent hydrorefining process for raw materials. In the above-mentioned examples, all the self-sulfurizing oil-soluble catalysts show excellent hydrogenating performance, including single-component self-sulfurizing oil-soluble molybdenum catalyst and nickel catalyst, double-component self-sulfurizing oil-soluble molybdenum-nickel composite catalyst and triple-component self-sulfurizing oil-soluble nickel-cobalt-iron composite catalyst, which effectively inhibit thermal cracking reaction to achieve a liquid yield higher than 98.7%. In addition, the oil-soluble catalyst has simple dispersion, no need for vulcanization and a small catalyst adding amount and high hydrogenation activity at a low temperature, and can effectively avoid possible coking during the preheating process of waste lubricating oil to ensure long-term stable operation of the device.

Example 5

A slurry bed pre-hydrotreatment product is further treated by deep hydrotreatment steps of the inventive method, that is, the slurry bed pre-hydrotreatment product obtained in Example 1 is introduced into a hydrorefining reactor, an isomerization-dewaxing reactor and a supplementary refining reactor in sequence, for deep hydrotreatment, wherein the hydrorefining catalyst, the isomerization-dewaxing catalyst and the supplementary refining catalyst can be selected from common commercial catalysts in the field. The hydrorefining catalyst FGL-302, the isomerization-dewaxing catalyst FGL-402 and the supplementary refining catalyst FGL-502, developed by the State Key Laboratory of Heavy Oil, are used in the example. The hydrorefining reactor operates at a partial pressure of hydrogen of 12 MPa in the reactor, a reaction temperature of 320° C., a liquid hourly space velocity of 2 h$^{-1}$ and a volume ratio of hydrogen gas to the slurry bed pre-hydrotreatment product of 600 Nm$^3$/m$^3$; the isomerization-dewaxing reactor operates at a partial pressure of hydrogen of 12 MPa in the reactor, a reaction temperature of 350° C., a liquid hourly space velocity of 1.5 h$^{-1}$ and a volume ratio of hydrogen gas to the slurry bed pre-hydrotreatment product of 600 Nm$^3$/m$^3$; and the supplementary hydrorefining reactor operates at a partial pressure of hydrogen of 12 MPa in the reactor, a reaction temperature of 300° C., a liquid hourly space velocity of 3 h$^{-1}$ and a volume ratio of hydrogen gas to the slurry bed pre-hydrotreatment product of 600 Nm$^3$/m$^3$. The reaction results are shown in Table 4.

TABLE 4

Deep hydrogenation reaction results

| Items | Example 5 |
| --- | --- |
| Naphtha fraction yield (<180° C.), m % | 4.04 |
| Total sulfur, μg/g | <10 |
| Nitrogen content, μg/g | <10 |
| Diesel fraction yield (180-360° C.), m % | 15.49 |
| Total sulfur, μg/g | <10 |
| Nitrogen content, μg/g | <10 |
| Polycyclic aromatic hydrocarbon, wt % | <5 |
| Cetane number | >51 |
| No. 4 base oil yield, m % | 28.41 |
| Pour point, ° C. | −20 |
| Viscosity index | 101 |
| No. 5 base oil yield, m % | 30.32 |
| Pour point, ° C. | −19 |
| Viscosity index | 109 |
| No. 6 base oil yield, m % | 12.31 |
| Pour point, ° C. | −21 |
| Viscosity index | 103 |
| Heavy base oil yield, m % | 6.08 |
| Pour point, ° C. | −21 |
| Viscosity index | 102 |
| Total liquid yield, m % | 97.65 |

From Table 4, it can be seen that high-quality naphtha, diesel and lubricating base oil fractions are obtained by processing waste lubricating oil with the inventive method. Therefore, the method for hydrotreating and recycling waste lubricating oil described in the invention has advantages such as simple process, high oil liquid yield, and good quality of lubricating base oil, and can realize full-fraction recycling of waste lubricating oil.

For those skilled in the art, the specific embodiments only provide an exemplary description of the present invention. Obviously, the specific implementation of the present invention is not limited by the above methods. Various nonessential improvements made using the method concept and technical solution of the present invention or direct applications of the concept and technical solution of the present invention to other occasions without improvement all fall within the scope of protection of the present invention.

What is claimed is:

1. A method for hydrotreating and recycling waste lubricating oil, comprising the steps of:
   S100) removing small-particle mechanical impurities from the waste lubricating oil with a filter; and separating free water and a portion of light hydrocarbons from the waste lubricating oil in a flash distillation column;
   S200) mixing a bottom product obtained from the flash distillation column in S100 with hydrogen gas and a self-sulfurizing oil-soluble transition metal catalyst; and pre-hydrotreating the mixture in a slurry bed hydrogenation reactor;
   S300) separating a reaction effluent obtained in S200 to obtain hydrogen-rich gas and a liquid product;
   S400) separating the liquid product obtained in S300 with two-stage hydrocyclone separators to obtain a liquid product and a tailing residue; allowing the tailing residue to enter a solvent recovery tower; and discharging a tower bottom effluent as a solid residue from the solvent recovery tower;
   S500) obtaining a slurry bed pre-hydrotreating product, which includes the liquid product from the two-stage hydrocyclone separators and a solvent from the solvent recovery tower;
   S600) mixing the slurry bed pre-hydrotreating product with hydrogen gas; and streaming the mixture sequentially through a hydrofining reactor, an isomerization-dewaxing reactor and a supplementary refining reactor while the mixture is caused to react in turn through contact with a hydrorefining catalyst, an isomerization-dewaxing catalyst and a supplementary refining catalyst; and S700) separating an output material in S600 to obtain a naphtha fraction, a diesel fraction and a lubricant base oil fraction, wherein:
the waste lubricating oil enters the slurry bed hydrogenation reactor through a bottom of the slurry bed hydrogenation reactor and then flows upwards after the waste lubricating oil is mixed with the hydrogen gas and the self-sulfurizing oil-soluble transition metal catalyst in the slurry bed hydrogenation reactor;
the self-sulfurizing oil-soluble transition metal catalyst includes one of molybdenum, nickel, iron and cobalt; and
S400 further includes setting the two-stage hydrocyclone separators to operate at a temperature of 50-180° C.

2. The method in claim 1, wherein:
the self-sulfurizing oil-soluble transition metal catalyst includes exactly one of molybdenum, nickel, iron and cobalt;
when the self-sulfurizing oil-soluble transition metal catalyst includes molybdenum:
S200 further includes mixing the bottom product from the flash distillation column with the hydrogen gas and a molybdenum catalyst; and
a mass ratio of molybdenum atoms to the waste lubricating oil is 50-800 μg/g;
when the self-sulfurizing oil-soluble transition metal catalyst includes nickel:
S200 further includes mixing the bottom product from the flash distillation column with the hydrogen gas and a nickel catalyst; and
a mass ratio of nickel atoms to the waste lubricating oil is 50-800 μg/g;
when the self-sulfurizing oil-soluble transition metal catalyst includes iron:
S200 further includes mixing the bottom product from the flash distillation column with the hydrogen gas and an iron catalyst; and
a mass ratio of iron atoms to the waste lubricating oil is 50-800 μg/g; and
when the self-sulfurizing oil-soluble transition metal catalyst includes cobalt:
S200 further includes mixing the bottom product from the flash distillation column with the hydrogen gas and a cobalt catalyst; and
a mass ratio of cobalt atoms to the waste lubricating oil is 50-800 μg/g.

3. The method in claim 1, wherein:
the self-sulfurizing oil-soluble transition metal catalyst is a composite catalyst which includes at least two of molybdenum, nickel, iron and cobalt;
S200 further includes mixing the bottom product from the flash distillation column with hydrogen gas and the composite catalyst; and
a mass ratio of atoms of the at least two of molybdenum, nickel, iron and cobalt to the waste lubricating oil is 50-800 μg/g.

4. The method in claim 1, wherein S100 further includes setting the flash distillation column to operate at:
a temperature of 100-200° C.; and
a pressure of 0.1-0.5 MPa.

5. The method in claim 1, wherein S200 further includes setting the slurry bed hydrogenation reactor to operate at:
a partial pressure of hydrogen of 4-20 MPa in the slurry bed hydrogenation reactor;
a reaction temperature of 320-420° C.;
a liquid hourly space velocity of 0.5-2 $h^{-1}$; and
a volume ratio of the hydrogen gas to the waste lubricating oil of 300-1,000 $Nm^3/m^3$.

6. The method in claim 1, wherein S600 further includes setting the hydrofining reactor to operate at:
a partial pressure of hydrogen of 4-20 MPa in the hydrofining reactor;
a reaction temperature of 280-400° C.;
a liquid hourly space velocity of 0.5-4 $h^{-1}$; and
a volume ratio of the hydrogen gas to the slurry bed pre-hydrotreating product of 300-1,000 $Nm^3/m^3$.

7. The method in claim 1, wherein S600 further includes setting the isomerization-dewaxing reactor to operate at:
a partial pressure of hydrogen of 4-20 MPa in the isomerization-dewaxing reactor;
a reaction temperature of 320-420° C.;
a liquid hourly space velocity of 0.5-4 $h^{-1}$; and
a volume ratio of the hydrogen gas to the slurry bed pre-hydrotreating product of 300-1,000 $Nm^3/m^3$.

8. The method in claim 1, wherein S600 further includes setting the supplementary refining reactor to operate at:
a partial pressure of hydrogen of 4-20 MPa in the supplemental refining reactor;
a reaction temperature of 250-400° C.;
a liquid hourly space velocity of 0.5-10 $h^{-1}$; and
a volume ratio of the hydrogen gas to the slurry bed pre-hydrotreating product of 300-1,000 $Nm^3/m^3$.

9. The method in claim 1, wherein:
the self-sulfurizing oil-soluble transition metal catalyst includes a self-sulfurizing oil-soluble molybdenum catalyst;
S200 further includes the steps of:
S210) subjecting thiomolybdate and organic amine to one-step reaction to obtain an oil-soluble molybdenum-based catalyst precursor; and
S220) adding the oil-soluble molybdenum-based catalyst precursor to an auxiliary dispersant to obtain the self-sulfurizing oil-soluble molybdenum catalyst;
a mass ratio of molybdenum to the oil-soluble molybdenum-based catalyst precursor is 1-20%;
the thiomolybdate includes at least one of ammonium tetrathiomolybdate, sodium tetrathiomolybdate and ammonium dodecathiomolybdate;
the organic amine includes at least one of C6-C20 primary amines; and
the auxiliary dispersant includes at least one of catalytic cracking diesel, catalytic cracking slurry oil, catalytic cracking gasoline, naphtha, straight-run diesel, straight-run gas oil, coker diesel and hydrocracking gas oil.

10. The method in claim 9, wherein:
S210 further includes the steps of:
S211) dissolving molybdate in ammonia water to obtain a solution in which a ratio of the ammonia water to the molybdate is 1/1-2 (mL/g);
S212) adding a sulfurization agent to the solution in S211; and reacting at 20-120° C. for 0.5-3 h to obtain a thiomolybdate solution, a molar ratio of the sulfur content in the sulfurization agent to the molybdenum being 4-6:1; and
S213) adding the organic amine to the thiomolybdate solution; and reacting at 20-120° C. for 0.5-2 h to obtain the oil-soluble molybdenum-based catalyst precursor, a molar ratio of the organic amine to the molybdenum being 2-4:1;

the molybdate includes at least one of molybdenum trioxide, ammonium heptamolybdate and ammonium tetramolybdate; and the sulfurization agent includes at least one of ammonium sulfide, ammonium polysulfide and sodium sulfide.

11. The method in claim 1, wherein:

the self-sulfurizing oil-soluble transition metal catalyst includes a self-sulfurizing oil-soluble molybdenum-nickel composite catalyst;

S200 further includes the steps of:
- S210) reacting a sodium salt of higher alcohol with carbon disulfide to obtain alkyl-substituted sodium dithiocarbonate; and then reacting the alkyl-substituted sodium dithiocarbonate with a nickel source to obtain an oil-soluble nickel-based catalyst precursor;
- S220) subjecting thiomolybdate and organic amine to one-step reaction to obtain an oil-soluble molybdenum-based catalyst precursor; and
- S230) adding the oil-soluble nickel-based catalyst precursor and the oil-soluble molybdenum-based catalyst precursor to an auxiliary dispersant to obtain the self-sulfurizing oil-soluble molybdenum-nickel composite catalyst;

a mass ratio of nickel to the oil-soluble nickel-based catalyst precursor is 1-10%;

a carbon number of the sodium salt of higher alcohol is 4-15;

the nickel source includes at least one of nickel nitrate, nickel acetate, basic nickel carbonate, nickel chloride and nickel sulfate;

a mass ratio of molybdenum to the oil-soluble molybdenum-based catalyst precursor is 1-20%;

the thiomolybdate includes at least one of ammonium tetrathiomolybdate, sodium tetrathiomolybdate and ammonium dodecathiomolybdate;

the organic amine includes at least one of C6-C20 primary amines;

the higher alcohol includes at least one of C4-C16 fatty alcohol, phenol, and alkyl substituted aromatic alcohol; and the auxiliary dispersant includes at least one of catalytic cracking diesel, catalytic cracking slurry oil, catalytic cracking gasoline, naphtha, straight-run diesel, straight-run gas oil, coker diesel and hydrocracking gas oil.

12. The method in claim 11, wherein:

S210 further includes the steps of:
- S211) heating the higher alcohol to 50-90° C.; adding sodium hydroxide to the higher alcohol while the higher alcohol is being stirred; and reacting at 50-110° C. for 0.5-6 h to obtain the sodium salt of higher alcohol, a molar ratio of the sodium hydroxide to the higher alcohol being 1-3:1;
- S212) adding the sodium salt of higher alcohol to carbon disulfide; and reacting at 10-90° C. for 0.5-6 h to obtain alkyl-substituted sodium dithiocarbonate, the molar ratio of the sodium salt of higher alcohol to the carbon disulfide being 1: 1-6;
- S213) dissolving the nickel source in water or ammonia water to obtain a solution;
- S214) adding the alkyl-substituted sodium dithiocarbonate to the solution in S213; and reacting at 50-100° C. for 0.5-3 h, a molar ratio of the alkyl-substituted sodium dithiocarbonate to nickel being 2-4:1; and
- S215) cooling what is obtained in S214 to room temperature; and removing water phase to obtain the oil-soluble nickel-based catalyst precursor, a mass ratio of nickel to the oil-soluble nickel-based catalyst precursor being 1-10%;

S220 further includes the steps of:
- S221) dissolving molybdate in ammonia water to obtain a solution in which a ratio of the ammonia water to the molybdate 1/1-2 (mL/g);
- S222) adding a sulfurization agent to the solution obtained in S221; and reacting at 20-120° C. for 0.5-3 h to obtain a thiomolybdate solution, a molar ratio of the sulfur content to the molybdenum in the sulfurization agent being 4-6:1; and
- S223) adding the organic amine to the thiomolybdate solution obtained in S222; and reacting at 20-120° C. for 0.5-2 h to obtain the oil-soluble molybdenum-based catalyst precursor, a molar ratio of the organic amine to the molybdenum being 2-4:1;

the molybdate includes at least one of molybdenum trioxide, ammonium heptamolybdate and ammonium tetramolybdate; and the sulfurization agent includes at least one of ammonium sulfide, ammonium polysulfide and sodium sulfide.

13. The method in claim 1, wherein:

the self-sulfurizing oil-soluble transition metal catalyst includes a self-sulfurizing oil-soluble nickel catalyst;

S200 further includes:
- S210) reacting a sodium salt of higher alcohol with carbon disulfide to obtain alkyl-substituted sodium dithiocarbonate;
- S220) reacting the alkyl-substituted sodium dithiocarbonate with a nickel source to obtain a nickel catalyst precursor; and
- S230) adding the nickel catalyst precursor to an auxiliary dispersant to obtain the self-sulfurizing oil-soluble nickel catalyst;

the nickel source includes at least one of nickel nitrate, nickel acetate, basic nickel carbonate, nickel chloride and nickel sulfate;

the higher alcohol includes at least one of C4-C16 fatty alcohol, phenol, and alkyl substituted aromatic alcohol; and the auxiliary dispersant includes at least one of catalytic cracking diesel, catalytic cracking slurry oil, catalytic cracking gasoline, naphtha, straight-run diesel, straight-run gas oil, coker diesel and hydrocracking gas oil.

14. The method in claim 13, wherein S220 further includes the steps of:
- S221) heating the higher alcohol to 50-90° C.; adding sodium hydroxide to the higher alcohol while the higher alcohol is being stirred; and reacting at 50-110° C. for 0.5-6 h to obtain the sodium salt of higher alcohol, a molar ratio of the sodium hydroxide to the higher alcohol being 1-3:1;
- S222) adding the sodium salt of higher alcohol obtained in S221 to carbon disulfide; and reacting at 10-90° C. for 0.5-6 h to the obtain the alkyl-substituted sodium dithiocarbonate, a molar ratio of the sodium salt of higher alcohol to the carbon disulfide being 1:1-6;
- S223) dissolving the nickel source in water or ammonia water to obtain a solution;
- S224) adding the alkyl-substituted sodium dithiocarbonate to the solution in S223; and reacting at 50-100° C. for 0.5-3 h, a molar ratio of the alkyl-substituted sodium dithiocarbonate to nickel being 2-4:1; and
- S225) cooling what is obtained in S224 to room temperature; and removing water phase to obtain the self-sulfurizing oil-soluble nickel catalyst in which a mass content of nickel is 1-10%.

15. The method in claim 1, wherein:
the self-sulfurizing oil-soluble transition metal catalyst includes a self-sulfurizing oil-soluble nickel-cobalt-iron composite catalyst;
S200 further includes the steps of:
- S210) reacting a sodium salt of higher alcohol with carbon disulfide to obtain alkyl-substituted sodium dithiocarbonate;
- S220) reacting the sodium salt of higher alcohol with a mixed solution of group VIII metals, which include a nickel source, a cobalt source and an iron source, to obtain a nickel-cobalt-iron composite catalyst precursor; and
- S230) adding the nickel-cobalt-iron composite catalyst precursor to an auxiliary dispersant to obtain the self-sulfurizing oil-soluble nickel-cobalt-iron composite catalyst;

a carbon number of the sodium salt of higher alcohol is 4-16;
a molar ratio of the alkyl-substituted sodium dithiocarbonate to the totality of nickel, iron and cobalt is 2-4:1;
the nickel source includes at least one of nickel nitrate, nickel acetate, basic nickel carbonate, nickel chloride and nickel sulfate;
the cobalt source includes at least one of cobalt nitrate, cobalt acetate, basic cobalt carbonate, cobalt chloride and cobalt sulfate;
the iron source includes at least one of ferric nitrate, ferric acetate, ferric chloride and ferric sulfate;
the higher alcohol includes at least one of C4-C16 fatty alcohol, phenol, and alkyl substituted aromatic alcohol; and
the auxiliary dispersant includes at least one of catalytic cracking diesel, catalytic cracking slurry oil, catalytic cracking gasoline, naphtha, straight-run diesel, straight-run gas oil, coker diesel and hydrocracking gas oil.

16. The method in claim 15, wherein:
S220 further includes the steps of:
- S221) heating the higher alcohol to 50-90° C.; and adding sodium hydroxide to the higher alcohol while the higher alcohol is being stirred; and reacting at 50-110° C. for 0.5-6 h to obtain the sodium salt of higher alcohol, a molar ratio of the sodium hydroxide to the higher alcohol being 1-3:1;
- S222) adding the sodium salt of higher alcohol to carbon disulfide; and reacting at 10-90° C. for 0.5-6 h to obtain the alkyl-substituted sodium dithiocarbonate, a molar ratio of the sodium salt of higher alcohol to the carbon disulfide being 1:1-6;
- S223) dissolving in water the nickel source, the cobalt source and the iron source to obtain a mixed solution;
- S224) adding the alkyl-substituted sodium dithiocarbonate to the mixed solution in S223; and reacting at 50-100° C. for 0.5-3 h, a molar ratio of the alkyl-substituted sodium dithiocarbonate to the totality of nickel, cobalt and iron being 2-4:1; and
- S225) cooling what is obtained in S224 to room temperature; and removing water phase to obtain the nickel-cobalt-iron composite catalyst precursor; and a molar ratio of the iron source, the cobalt source and the nickel source is (1-10):(1-5):1.

17. The method in claim 1, wherein:
S400 further includes setting the two-stage hydrocyclone separators to operate at a pressure of 0.2-2 MPa; and
a mass ratio of a solvent used in the solvent recovery tower to the tailing residue obtained from the two-stage hydrocyclone separators is 1-10:1.

* * * * *